(12) United States Patent
Caudell

(10) Patent No.: US 9,743,138 B2
(45) Date of Patent: Aug. 22, 2017

(54) METHOD FOR SOUND RECOGNITION TASK TRIGGER

(71) Applicant: John Caudell, Jersey City, NJ (US)

(72) Inventor: John Caudell, Jersey City, NJ (US)

(73) Assignee: MUTR LLC, Jersey City, NJ (US)

( * ) Notice: Subject to any disclaimer, the term of this patent is extended or adjusted under 35 U.S.C. 154(b) by 0 days.

(21) Appl. No.: 14/815,858

(22) Filed: Jul. 31, 2015

(65) Prior Publication Data

US 2017/0034579 A1    Feb. 2, 2017

(51) Int. Cl.
| | |
|---|---|
| *H04N 21/44* | (2011.01) |
| *H04N 21/454* | (2011.01) |
| *H04N 21/81* | (2011.01) |
| *H04N 21/439* | (2011.01) |
| *H04N 21/442* | (2011.01) |

(52) U.S. Cl.
CPC ..... *H04N 21/4542* (2013.01); *H04N 21/4394* (2013.01); *H04N 21/4396* (2013.01); *H04N 21/44008* (2013.01); *H04N 21/44204* (2013.01); *H04N 21/454* (2013.01); *H04N 21/812* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,307,193 | A * | 4/1994 | VanZeeland | H04B 1/205 340/12.22 |
| 6,597,405 | B1 * | 7/2003 | Iggulden | H04N 5/44 348/460 |
| 7,081,581 | B2 | 7/2006 | Allamanche et al. | |
| 7,460,994 | B2 | 12/2008 | Allamanche et al. | |
| 7,478,045 | B2 | 1/2009 | Allamanche et al. | |
| 7,580,832 | B2 | 8/2009 | Allamanche et al. | |
| 8,233,999 | B2 | 7/2012 | Herberger et al. | |
| 8,417,096 | B2 | 4/2013 | Gharaat et al. | |
| 8,949,872 | B2 | 2/2015 | Slaney et al. | |

(Continued)

OTHER PUBLICATIONS

Mufin GmbH, Audio In-App Recognition System, https://www.mufin.com/wp-content/uploads/mufin_audioid_in-apprecognition_flyer.pdf.

(Continued)

*Primary Examiner* — Nathan Flynn
*Assistant Examiner* — Christine Kurien
(74) *Attorney, Agent, or Firm* — Eric L. Sophir; Dentons US LLP

(57) ABSTRACT

A system and method is described for monitoring a program signal for certain content, and performing a set of tasks when target content is recognized. Target content may be identified by using acoustic or video fingerprinting hardware or software to identify characteristic components of the program signal, and performing a lookup in a database of known content. When a match is made to known content, a task maybe performed such as muting the audio, blocking the video, or fast-forwarding past the content. A secondary action unit may be employed to receive control signals and rebroadcast the same to a media device. When the broadcast of the target media is determined to have completed, a corollary set of tasks are performed. In embodiments, the system may be implemented as one or more standalone hardware components, or in software.

20 Claims, 8 Drawing Sheets

(56) References Cited

U.S. PATENT DOCUMENTS

| | | |
|---|---|---|
| 2003/0055722 A1 | 3/2003 | Perreault et al. |
| 2009/0007195 A1 | 1/2009 | Beyabani |
| 2009/0150445 A1 | 6/2009 | Herberger et al. |
| 2010/0250510 A1 | 9/2010 | Herberger et al. |
| 2010/0319015 A1 | 12/2010 | Remington |
| 2012/0023403 A1 | 1/2012 | Herberger et al. |
| 2014/0006945 A1 | 1/2014 | Herberger et al. |
| 2014/0044268 A1 | 2/2014 | Herberger et al. |
| 2014/0188592 A1 | 7/2014 | Herberger et al. |
| 2014/0277644 A1* | 9/2014 | Gomes-Casseres .... G06F 17/00 700/94 |
| 2014/0282662 A1* | 9/2014 | Major ................ H04N 21/8358 725/18 |
| 2015/0279381 A1* | 10/2015 | Goesnar ............. G06Q 30/0241 704/500 |

OTHER PUBLICATIONS

International Search Report and Written Opinion of the International Searching Authority mailed Sep. 30, 2016 in International Application No. PCT/US2016/042199, 9 pages.

\* cited by examiner

| Time | Fingerprint ID | ContentID |
|---|---|---|
| 2.60063492063492 | 879396052 | 15 |
| 14.50177857773610 | 563136967 | 712 |
| 3.09011397650017 | 274684339 | 865 |
| 25.97865629614012 | 606460464 | 115 |
| 19.6999123513409 | 694878796 | 142 |

FIG. 5a

| Content ID | ContentName | ContentLength |
|---|---|---|
| 15 | TVAD159 | 29.7215419501132 |
| 712 | TVNC17103 | 14.3876478200887 |
| 865 | TVAD101 | 29.8215419501131 |
| 115 | TVAD099 | 30.2299123513477 |
| 142 | TVAD267 | 28.4874587587589 |

FIG. 5b

Query 1
SampleTime t = 0.0

| Matched Ad | SampleTime |
|---|---|
| 7 | 10.0 |
| 14 | 1.50 |
| 16 | 5.20 |
| 34 | 22.0 |
| 453 | 2.40 |

FIG. 7a

| AdID | LastTime | LastAdTime | ChainLength |
|---|---|---|---|
| 7 | 0.0 | 10.0 | 1 |
| 14 | 0.0 | 1.50 | 1 |
| 16 | 0.0 | 5.20 | 1 |
| 34 | 0.0 | 22.0 | 1 |
| 453 | 0.0 | 2.40 | 1 |

FIG. 7b

Query 2
SampleTime t = 0.11

| Matched Ad | SampleTime |
|---|---|
| 7 | 10.12 |
| 7 | 23.40 |
| 8 | 4.80 |
| 16 | 5.31 |
| 20 | 6.80 |
| 145 | 1.90 |
| 453 | 2.50 |
| 613 | 5.00 |

FIG. 7c

SampleTime t = 0.11

| AdID | LastTime | LastAdTime | ChainLength |
|---|---|---|---|
| 7 | 0.11 | 10.12 | 2 |
| 8 | 0.11 | 4.80 | 1 |
| 14 | 0.00 | 1.50 | 1 |
| 16 | 0.11 | 5.31 | 2 |
| 20 | 0.11 | 6.80 | 1 |
| 34 | 0.00 | 22.0 | 1 |
| 145 | 0.11 | 1.90 | 1 |
| 453 | 0.11 | 2.50 | 2 |
| 613 | 0.11 | 5.00 | 1 |

FIG. 7d

Query 3
SampleTime t = 0.22

| Matched Ad | SampleTime |
|---|---|
| 7 | 10.22 |
| 14 | 1.77 |
| 98 | 8.12 |

FIG. 7e

SampleTime t = 0.22

| AdID | LastTime | LastAdTime | ChainLength |
|---|---|---|---|
| 7 | 0.22 | 10.22 | 3 |
| 8 | 0.11 | 4.80 | 1 |
| 14 | 0.22 | 1.77 | 2 |
| 16 | 0.11 | 5.31 | 2 |
| 20 | 0.11 | 6.80 | 1 |
| 34 | 0.00 | 22.0 | 1 |
| 98 | 0.22 | 8.12 | 1 |
| 145 | 0.11 | 1.90 | 1 |
| 453 | 0.11 | 2.50 | 2 |
| 613 | 0.11 | 5.00 | 1 |

FIG. 7f

METHOD FOR SOUND RECOGNITION TASK TRIGGER

BACKGROUND

Commercial advertising remains an irritant to many television viewers and radio listeners, disrupting the normal flow of a television program with information that the viewer may find of marginal or no interest. The amount of advertising shown to viewers and listeners has also been steadily rising. According to one Nielsen survey, in 2009, broadcast networks averaged 13 minutes and 25 seconds of commercial time per hour, a figure that rose to 14 minutes and 15 seconds by 2015. Cable television advertising amounted to 15 minutes and 38 seconds per hour in 2013. Spending by advertisers has also increased to $78 billion in 2013, compared to $64 billion in 2009.

The advertising burden is not limited to broadcast and cable television. Streaming services such as Hulu and Spotify (among others) interject advertising into their program streams and in some instances disable the viewer's ability to skip or mute the commercial.

The quantity of commercial advertising is only one part of the problem. In response to complaints that commercial advertisers were intentionally raising the volume of commercials to draw attention, the Commercial Advertisement Loudness Mitigation Act, Public Law 111-311, was passed in 2010. The Act requires that commercials have the same average volume as the programs that they accompany. However, the FCC has received complaints that broadcasters have been manipulating the volume in commercials so that the volume was increased at the beginning, and softer in the middle, so that the average volume matched the underlying program. During hearings on revisions to the Act, the FCC disclosed that it had received over 20,000 complaints beginning with the 2012 effective date of the Act.

Currently, when a consumer is watching or listening to media, and an advertisement is broadcast, the consumer may manually mute the programming, or in the case of recorded content, fast-forward or skip past advertisements using a remote control. However, to avoid commercial content (or other undesirable programming) the user must manually engage the television, DVR, or other device, and monitor the same until the desired programming resumes. Such a system is unwieldy, distracting, and often results in the user missing segments of the program.

Some broadcast systems—such as Hulu—disable the ability to fast-forward through commercial content. The user is thus required to wait the duration of the commercial and monitor the same so the he or she does not miss the beginning of the desired content. Similarly, some systems—Spotify, for example—will monitor the user's volume level and detect if the user has muted the volume. If the volume has been muted, the system will actually wait, pausing the commercial content, until the volume level has been restored to an audible level. The user is thus required to listen to the commercial content even on services that they may have sought out for a commercial-free experience.

Systems for skipping commercial content have been proposed, all of which have significant shortcomings. For example, one commercial skipping technology relied on the presence of a black screen that would appear in the program stream between a program and advertisement to differentiate between the two. When the black screen appeared the system would know to skip to the subsequent black screen that indicated the resumption of non-commercial programming. Over time, broadcasters removed the black screen, which rendered the technology obsolete.

A more recent device, the Hopper DVR by DISH Network, relies on a centralized database of advertisement times in broadcasts and sends those times to the remote DVRs, which allows the customer to automatically skip commercials in the broadcast. However, this system requires monitoring all broadcast television programs and identifying the time brackets when commercials were shown. When the user watches a recording of the show, the system interacts with the database to identify when to automatically skip the commercials. This system is problematic in that it is highly labor intensive and expensive to implement. The system is also limited to subscribers of a specific content provider.

The TV Ad Blocker system attempts to remove advertising from television broadcasts by utilizing a centralized database. However, this product requires an active Internet connection during television viewing and cannot provide blocking of non-television content such as streaming video or audio. Further, the TV Ad Blocker requires an identification of the service provider and cannot operate merely by monitoring the content.

Other mechanisms have been attempted for blocking content beyond just commercial advertising. For example, the V-chip standard in the United States requires that broadcasters provide rating information (indicating the amount of violence, adult language, etc.) for their programming, and television manufacturers include a chip for decoding the program rating and selectively blocking programming that exceeds a user-defined threshold. However, the V-chip system has significant limitations. First, the V-chip system requires the participation of broadcasters to rate their programming and encode that rating in the broadcast signal. Second, the V-chip system does not currently work with commercial programming, as there is no requirement to encode that content with a rating. Even if the V-chip system were extended to commercial programming, only violent or other age-inappropriate content could be blocked. There is no mechanism for blocking all content that is, for example, a television commercial. Since the companies behind the commercials are the customers of the broadcast networks, it is unlikely that they would also be willing to facilitate a system that blocked commercial content.

As television viewing is often a family or group experience, commercial interruption can take time away from family or group interaction.

Accordingly, there is a need for a system for blocking or muting undesirable programming that is automated and requires limited or no intervention by a user.

There is a further need for a content-blocking system that operates on multiple networks and is independent of the content provider or broadcaster.

More specifically, there is a need for a system that, when recognizing an advertisement, will mute or skip that advertisement, then un-mute or un-block the media once that advertisement has finished playing, or begin playing at a point after the advertisement has ended.

BRIEF DESCRIPTION OF THE DRAWINGS

The features and advantages of the present disclosure will be more fully understood with reference to the following detailed description when taken in conjunction with the accompanying figures, wherein:

FIGS. 5a-5b show sample database tables for use with embodiments of the invention.

FIGS. 7a-7f show various steps in the verification of a potential match with a content block.

SUMMARY

Figure 1:
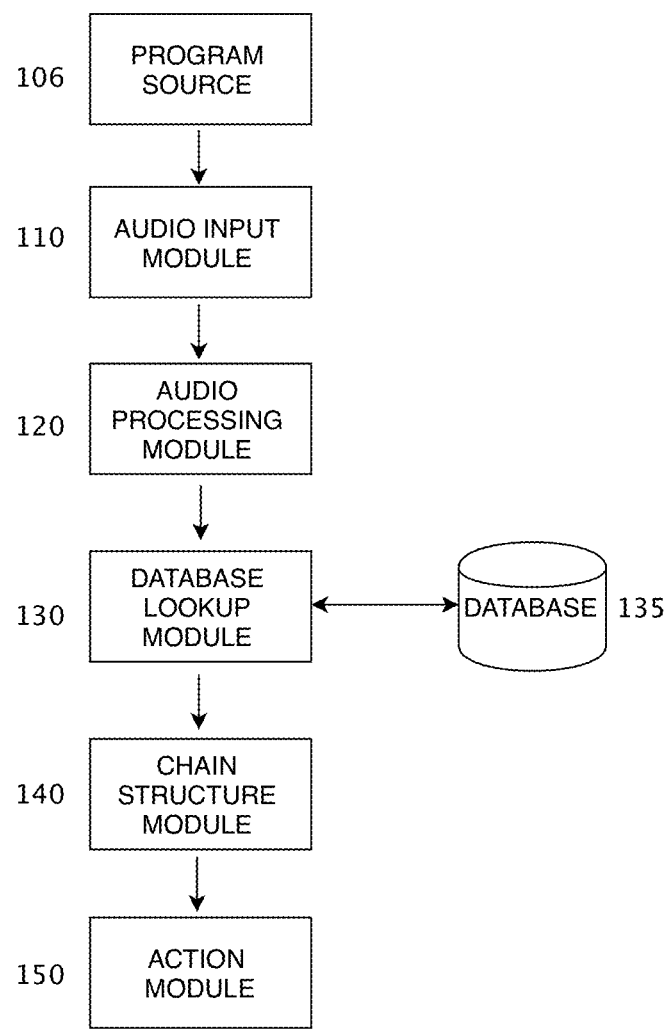
FIG. 1 is a block diagram showing an overview of the functional components of an embodiment of the invention.

In some embodiments, a system adapted to monitor content from a program stream may include an audio input subsystem configured to receive audio program data; an audio processing module, configured to divide the program stream into frames of data and generate an identifier representing the frame of data; a database lookup module in communication with a database of program content identifiers and configured to determine whether an identifier matches an entry in the database; a chain generation module configured to evaluate series of matches with the database and determine whether an action should be taken relative to the program stream; and/or a signal generator configured to send a command to a media device to take an action relative to the program stream.

In some embodiments, the audio input subsystem, audio processing module, database lookup module, and chain generation module are contained in a housing. In some embodiments, the audio input subsystem, audio processing module, database lookup module, and chain generation module are implemented on a personal computer or personal computing device.

In some embodiments, the housing is a dongle that may pair with the HDMI port of a media device. In some embodiments, the audio processing module is implemented as a system on a chip. In some embodiments, the audio processing module may further include a digital fingerprint subsystem. In some embodiments, the digital fingerprint subsystem utilizes a Fourier transform to generate an integer value representing the frame of data. In some embodiments, the signal generator is a standalone unit in wireless communication with the chain generation module. In some embodiments, the standalone unit may include one or more wireless transceivers for receive communication with the chain generation module, and with a media device. In some embodiments, the signal generator is configured to receive infrared control codes from a remote control, and repeat the codes to a media device. In some embodiments, the action relative to the program stream is one of blocking all of program stream, blocking a portion of the program stream, and changing to a different program stream.

In some embodiments, a method of monitoring content from a program stream may include providing a control unit; receiving program audio data at the audio input subsystem; causing the audio processing module to divide the program stream into frames of data and generate an identifier representing the frame of data; performing a lookup, using the database lookup module, in a database of program content identifiers and determining whether an identifier matches an entry in the database; evaluating series of matches with the database and determine whether an action should be taken relative to the program stream; and/or sending a signal to a media device to implement the action.

In some embodiments, the providing a control unit may include an audio input subsystem, audio processing module, database lookup module, chain generation module, and signal generator. In some embodiments, the control unit is implemented on a personal computer or personal computing device. In some embodiments, the control unit is housed in a dongle configured to pair with the HDMI port of a media device. In some embodiments, the audio processing module may further include a digital fingerprint sub-method. In some embodiments, the digital fingerprint sub-method utilizes a Fourier transform to generate an integer value representing the frame of data.

In some embodiments, a system adapted to block content from a program stream may include means for receiving audio program data, means for dividing the audio program data into individual frames, means for generating a digital fingerprint identifier representing individual frames, database lookup means for determining whether an identifier matches an entry in the database, chain generation means for evaluating series of matches with the database and determine whether the program stream should be blocked or unblocked, and/or signal generator means for sending a block signal to a media device.

In some embodiments, the means for generating a digital fingerprint identifier audio processing module may further include a digital fingerprint subsystem. In some embodiments, the digital fingerprint subsystem utilizes a Fourier transform to generate an integer value representing the frame of data. In some embodiments, the signal generator means is a standalone unit in wireless communication with the chain generation module. In some embodiments, the database contains digital fingerprint data representing segments of commercial television content. In some embodiments, the signal generator means is configured to emulate the remote control of the media device.

DETAILED DESCRIPTION

In embodiments, a system and method are described for monitoring a program signal for certain content, and performing a set of tasks when target content is recognized. In embodiments, target content may be identified by using acoustic or video fingerprinting to identify characteristic components of the program signal, and performing a lookup in a database of known content. When a match is made to known content, a task maybe performed such as muting the audio, blocking the video, or fast-forwarding past the content. When the broadcast of the target media is determined to have completed, a corollary set of tasks are performed. In embodiments, the system and method of the present invention is able to identify undesirable content—such as commercial advertising—and block the audio and/or video stream for the duration of the content.

Referring to FIG. 1, an exemplary process flow is shown describing the high level functioning of the system. In a preferred embodiment, an audio input module 110 receives audio data from a program source 106.

Exemplary program signals include those originating from television or video broadcasts, including terrestrial, satellite, cable or fiber optic television broadcasts; streaming video; or any other programming medium in which commercial advertising or other undesirable content has been incorporated. In embodiments, the system of the present invention may be employed with audio-only signals such as AM or FM radio, satellite radio, or audio streaming services such as Pandora or Spotify.

Program data may then be processed by audio processing module 120 into discrete frame segments that can be further processed and analyzed. If the audio is in analog format at this point, it will be converted to digital data in block 120 by methods that will be apparent to those of skill in the art. In embodiments, an identifier—such as a digital fingerprint—may be generated for each frame so that a search can be made for the frame segment in a database of known content.

A database lookup module 130 may then look up the identifier of each individual frame in a database of known undesirable content 135, and the system determines whether a match has been made.

Where matches are made between the acoustic fingerprints of individual frames and the database, a data structure known as a "chain" is formed by chain structure module 140 to hold the results of the matches, along with other data that is used to verify whether a match has actually been made. To improve accuracy and reduce false positives, multiple matches may be required before the system can confirm the presence of undesirable content.

When the required number of units in the chain has been met in block 140, a match can be confirmed and action is taken on the incoming signal such as, for example, blocking the audio for the duration of a commercial. Action module 150 may manage the interaction with external sources and devices to facilitate the blocking.

During the undesirable programming, the system may continue to monitor and evaluate the audio feed, comparing against the database, until it is able to confirm that the undesirable content has completed. Full control is then returned to the media device.

Specific implementations of the foregoing system will now be described.

Figure 2:
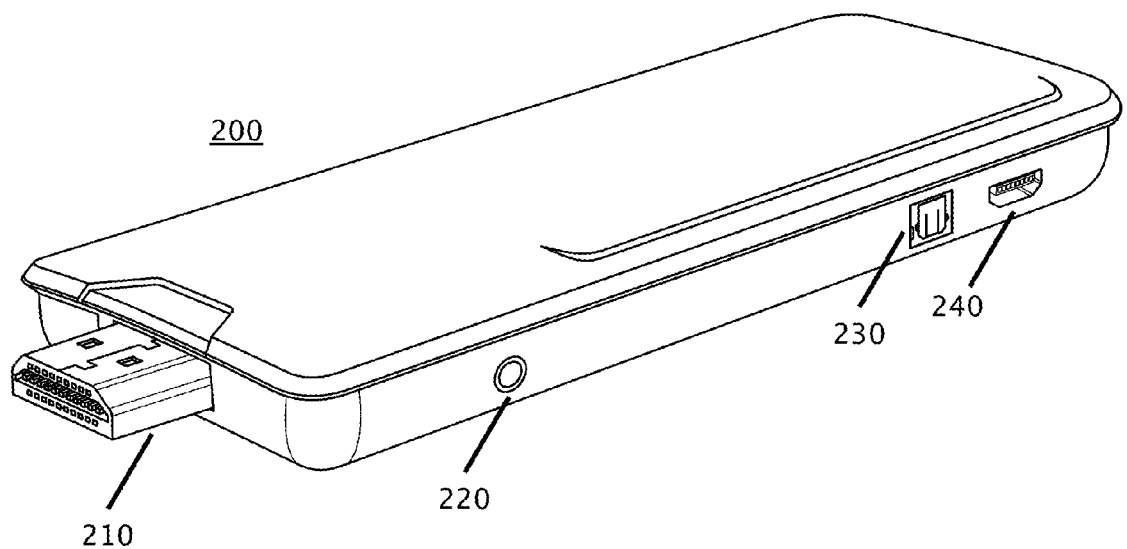
FIG. 2 is an exemplary embodiment of the invention that plugs directly into a media device.

The processing hardware used to implement the system may be provided in any number of formats. In a preferred embodiment, the system electronics may be housed in a dongle that may be inserted into a port on a television or other media device. In embodiments, dongle is configured to be inserted into a USB or HDMI port of a television, computer or other media device. An exemplary dongle 200 is shown in FIG. 2. An exemplary unit 200 may include an HDMI connector 210 for mating with a complementary port on a media device. In embodiments dongle 200 may be powered through port 210, or alternatively, through a separate external power supply. Additional ports may be provided to communicate with a media device and to receive audio or video signals, and to communicate information back to the media device. For example, as shown in FIG. 2, ports may include a 3.5 mm audio jack 220, SPDIF optical audio port 230, and micro USB port 240. The device 200 may also receive an audio or video signal by various means such as through HDMI connector 210. Information relevant to system operation (e.g., remote control codes) may be loaded onto device 200 using an integrated memory card port, USB port, or wireless connection. In embodiments, a graphical user interface for programming or setting up the system may be provided through HDMI connector 210.

In embodiments, dongle may include a processor running an operating system, memory, a communications or network link, and a graphic processor. Prototype versions of embodiments of the present invention have been successfully implemented using a Rikomagic RK3188T with a quad core ARM Cortex-A9 processor running at 1.4 GHz, a quad core Mali-400 MP4 graphics processor 533 MHz, 2 GB RAM, and Bluetooth 4.0. Various Linux-based operating systems (e.g., Ubuntu) have been found to work with this configuration. Custom enclosures with similarly rated hardware may be substituted.

In alternative embodiments, system electronics may be enclosed in a standalone box that is connected to the television via an HDMI or other cable, and powered via an external power supply or via an HDMI CEC interface. In further alternative embodiments, system electronics may be housed in the television or media device itself rather than a separate device.

In aftermarket configurations where a single embodiment of the present device is configurable to work with any of a number of media devices, means may be provided for the processing hardware to control the media device. It has been found that providing by mimicking the operation of the media device's remote control unit, a single embodiment can be provided to work with numerous media devices.

A secondary action unit ("SAU") may thus be provided for implementing instructions provided by processing hardware in response to content matches.

In embodiments, SAU may be a standalone, battery-powered unit with a Bluetooth transceiver for receiving instruction from processing hardware, and an infrared transmitter for providing commands to media device.

In embodiments, SAU is powered by a long-lasting, compact battery that provides extended life. In a preferred embodiment, a lithium coin cell battery may be used to power to SAU. In an alternative embodiment, SAU may be configured with a rechargeable battery that permits recharging via a wall adapter, induction charging pad, common adapters standards such as USB, and the like. In still further embodiments, the SAU may be powered by a cable connected to a conventional home outlet. In alternate embodiments, SAU may be paired to system by a wired connection that provides data and/or power. In still further embodiments, SAU may be replaced with an IR blaster type device for sending remote control signals to a media device.

In addition to Bluetooth and infrared transceivers, SAU may contain a microprocessor and memory for identifying Bluetooth commands received from the dongle, performing a lookup in the memory, and transmitting the appropriate infrared signal to the television.

In embodiments, SAU may be programmed to mimic the infrared signal of the media device. In embodiments, SAU may be configured to learn remote control codes relevant to the operation of the system such as, for example, muting the audio, powering the device on or off, fast-forwarding, or changing the channel.

In alternate embodiments, SAU may come pre-loaded with and index of remote control codes for common brands of media devices, which index may be updated from time to time. A user may be provided with a means to select the specific media device in use such as a graphical interface delivered on the media device. In such a configuration, a user's selections may be communicated from the processing hardware to the SAU via the Bluetooth link.

In embodiments, rather than a separate dongle and SAU, the system may be directly integrated into a media device by the manufacturer. The elements of the invention would remain essentially the same in such a configuration, though communication with the media device would be simplified. In further embodiments, rather than a television, the system may be integrated into a personal computer or portable media device to monitor content playable on the device. It will be apparent to one of skill in the art how to apply the teachings of the present invention into these portable devices.

As will be discussed further below, when processing hardware determines that a muting or other signal should be sent to the media device, it may provide a signal via a Bluetooth link to the SAU, which in turn will deliver an infrared signal to the media device as if it were the device's own remote control.

To facilitate the analysis of a program stream, an audio input module is provided for receiving an incoming audio signal from the media device or broadcast channel. Audio sources may include a television, cable box, DVR, Apple TV, Google Chromecast, Roku, personal computer, smartphone, home theater component or the like. In embodiments, an audio signal may be received via any commercially available connection means such as HDMI, Toslink, coaxial, 2.5 or 3.5 mm connectors, or RCA cables. In embodiments, an audio signal may be received by the system over a wireless connection such as Bluetooth, Airplay, or the like. In further embodiments, the system may be integrated and hard-wired into the media device. In embodiments, the audio signal may be digital or analog.

In a preferred embodiment, audio signal may be a digital signal having a sample rate of 44.1 KHz.

Figure 3:
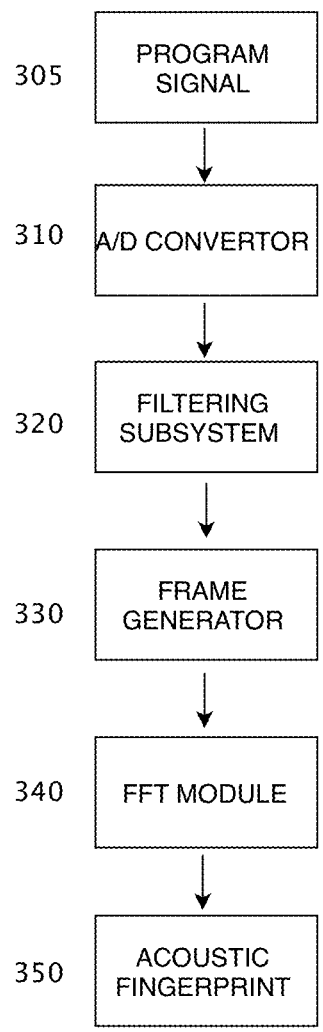
FIG. 3 is a block diagram view of an audio processing module.
Figure 4:
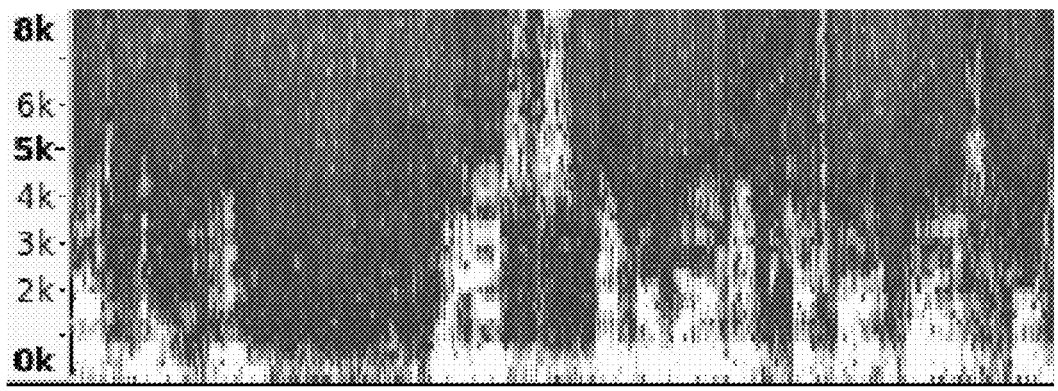
FIG. 4 shows a spectrogram of a sample audio segment.

Referring to FIG. 3, an expanded block diagram of the audio processing subsystem 300 is shown. An exemplary audio processing subsystem may take an incoming audio signal, convert the signal to digital format (if necessary), equalize and filter the signal, divide the signal into discrete frames of audio data, and generate a unique ID representing that frame.

Various acoustic fingerprint schemes exist and are known to those of skill in the art. While various schemes can be implemented with the invention, below follows a preferred implementation that has been found to be especially suitable for the application.

As the fingerprint generation scheme operates on a digital signal, fingerprint creation module may first identify whether the signal is audio or digital and, in the case of an analog signal, convert the signal to a digital format. Conversion may be accomplished with a dedicated analog-digital convertor 310 implemented as a dedicated integrated circuit, or in software running on a dedicated microprocessor. In a preferred embodiment, an analog signal is converted to a digital signal having a sample rate of 44.1 KHz.

In embodiments, a filtering subsystem 320 may further process a digital signal to filter noise and otherwise enhance the signal for more accurate identification. For example, in embodiments, audio processing module performs basic pre-processing techniques to an audio signal such as equalization, noise filtering, and normalization. In embodiments, an analog signal may be processed prior to conversion to digital format.

The digital signal may then be divided into discrete frames by frame generator 330, each frame representing the content of the audio signal at a particular point in time.

For example, in a digital signal having a sample rate of 44.1 KHz, 44,100 segments of data corresponding to the audio signal will be generated each second. To increase efficiency, the system of the present invention may selectively sample fewer than the full data stream and still gather enough data so that useful identification of the audio can be made. It has been found that for a television signal, analyzing a frame of audio data at intervals of approximately 10.76 milliseconds provides adequate data to compare against the database. The sample interval can be varied according to the nature of the signal being analyzed, processing power of the embodiment of the invention, and other factors.

In embodiments, a frame of audio data will have approximately 4,096 bytes.

As digital data is copied at the prescribed interval, it may then be passed to the FFT module 340, which converts each frame of audio data from the time domain to the frequency domain using a function such as the Fourier Transform.

It will be appreciated by those of skill in the art that any transform or process may be used for processing a frame of data provided that the transform or process generate an identifier that can be referenced against a database of known content to used to verify the identify or to variety of transforms and processes are suitable for converting a frame of audio data from the time domain to the frequency domain. Generation of the audio fingerprint may be accomplished in a variety of way such as a dedicated processing chip, a programmable microprocessor embedded in the device, or software running on a general purpose computer. Such processing may be accomplished using conventional libraries such as the NumPy Python scientific computing package running on the system processor. Alternatively, processing could be performed in hardware using a dedicated digital signal processor such as the Texas Instruments TMS320C5505.

In embodiments, FFT module will return an array of values representing the quantity of peaks in a given frequency range. In exemplary embodiments, will return a 12-digit array value.

In a preferred embodiment, audio fingerprint generation by FFT module 440 comprises a series of steps that will take sample of audio at a specific point in time, convert the audio from the time domain to the frequency domain to generate a spectrogram showing frequency as a function of time for the length of the sample. An exemplary time sample may be less than 11 milliseconds in length and generate a frame of 4,096 bytes.

Peaks in the amplitude may then be identified. Peaks in amplitude are more pronounced and more likely to survive signal noise or degradation, or even environmental factors. A spectrogram representing a sample audio signal is shown in FIG. 5. The spectrogram is a graphical representation of frequency peaks (vertical axis) over time (horizontal axis). Peaks clustered within frequency bands in a time frame are used to create fingerprints for content recognition.

The amplitude peaks are processed by a function that groups both the amplitude peaks and the time differences between the peaks to an integer value representing the content.

In embodiments a database of acoustic fingerprints may be provided. Acoustic fingerprint database may be stored locally or remotely and connected via a network connection. In embodiments, acoustic fingerprint database may contain data representing the acoustic fingerprint of known content (e.g., advertising) or other content that users desire to blank.

It will be appreciated by those of skill in the art that any number of database systems may be utilized provided that they are capable of managing the vast number of audio fingerprints that may be stored, can rapidly perform searches of the database such that the system is able to keep up with the incoming flow of data. In exemplary embodiments, a database may routinely store upwards of 250,000 fingerprints—or more—and be asked to perform lookups in the database many times per second.

Database systems that have been shown to be suitable include SQLite, MS SQL Server, MySQL, or Oracle Database. Turnkey systems such as Amazon EC2 for Microsoft SQL Server 2014 may also be employed. Depending on the nature of the content to be blanked, a pre-established system could be employed, such as the AcoustID open source system. Where a pre-established system is used, the audio fingerprint specifications may need to be modified to comport with the structure requirement by the system.

In embodiments, database system may support a variety of lookup techniques such as a tree-based search, hierarchical search, or hash table, among others. As with the overall performance of the database, consideration should be given to the ability of the lookup technique to keep pace with the incoming flow of data.

Content stored in the database come from any combination of pre-populated entries provided by the system provider, data from individual users of the system, and data aggregated from other sources. For example, in an exemplary embodiment, the system provider may monitor commercial advertising and tag new commercials for entry in the database. Simultaneously, users of the system may update the database with their own information as new commercials are flagged and blanked. Third party commercial sources may also provide monitoring and tagging services and make data available for a fee that can be loaded into the database.

Referring to FIGS. 5a-5b, an exemplary database table schema is shown as a two-table relational model. FIG. 5a contains fields for the time within the content where the sample occurs, the acoustic fingerprint ID of a particular audio sample, and a unique identifier representing the content or advertisement containing the sample corresponding to the acoustic ID. FIG. 5b may contain sample fields for the identifier of the content or advertising, the name of the content, and the total length of the content. The identifier of the content or advertising may then act as the key between the two tables. Various other database configurations and data structure are contemplated as coming within the scope of the invention. The exemplary tables show in FIGS. 5a-5b are abbreviated to highlight a particular structure that has been shown to work with the present invention. Actual tables implemented with the present invention may be many hundreds or thousands of entries long.

System logic may then perform a database lookup for the fingerprint data coming from the user's system using methods that will be apparent to those of skill in the art.

If the comparison logic determines that there is no match in the database for the current fingerprint a match is not found in the database, there is no known match to advertising or other content to be blocked and the system takes no action.

If a match is found in the database, it is sent to a chain subsystem for further verification.

Determining whether a valid match has been made between an incoming audio signal and a database of audio segments may require multiple matches and levels of redundancy to reduce false-positives. For example, several milliseconds of silence may occur in countless content segments and would thus not be an appropriate basis for a match. Similarly, a tone in E flat lasting for 0.025 seconds could occur in any number of content segments and would not be a useful basis for a match.

Accordingly, in embodiments, chains of potential matches are generated until a predetermined number of matches have been made within a content block. The length of the current chain is referred to as the CHAIN_LENGTH.

In embodiments, a chain is a sequence of one or more hits in the database that is stored until a match has been confirmed or it is determined that a new content segment has begun and the prior chain data should be discarded. Since an acoustic ID may be a match for numerous samples, each of the various matches may be tracked over multiple rounds of sampling until one emerges as a match.

Figure 6:
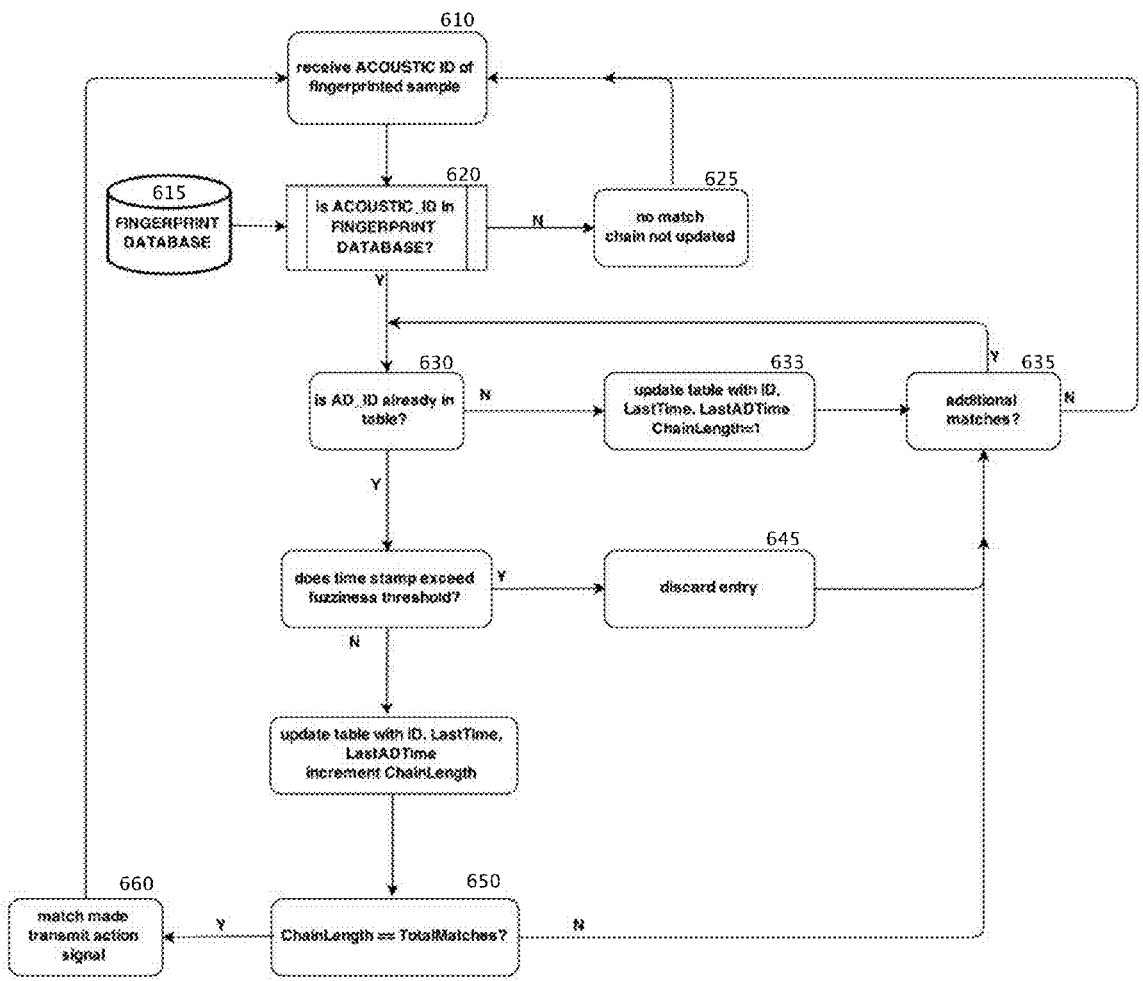
FIG. 6 is a flowchart describing the logic of the chain subsystem.

Referring to FIG. 6, a flowchart describing an exemplary chain generation method is disclosed.

Two system-wide variables may be made available during the chain generation method. TOTALMATCHES is the length of a chain for which a match will be assumed. For example, if TOTALMATCHES were set to be 7, then once a chain reached a length of 7 units, a match would be assumed.

A second variable—TIMEFUZZ—indicates the permissible time difference fuzziness between the audio sample time difference (LASTTIME, below) and the commercial match time (SAMPLETIME, below). Both TOTALMATCHES and SAMPLETIME may be preset by the manufacturer or may be adjustable by the user in the system settings.

An exemplary chain is a dynamic table containing columns for four data points measured for each potential match, namely, AdID, LASTTIME, LASTADTIME, and CHAINLENGTH. Rows may also be provided for each match under consideration. A sample chain table is shown in FIG. 7b.

AdID may represent the identity of content in which the match was made. AdID may represent a particular commercial, a segment of a program containing violence, or any other content block for which monitoring is desired.

LASTTIME may represent the elapsed time since the last match was made. For example, if 20.20 seconds have elapsed since the last match, the LASTIME segment would hold 20.20.

LASTADTIME may represent the time in the identified content segment that the identification was made. For example, a fingerprint lining up with a content block at 24.20 s would 24.20 in the LASTADTIME fields.

CHAINLENGTH may represent the length of the current chain, in chain units.

Referring to the FIG. 6 flowchart the process for verifying matches using the chain system is described. An ACOUSTIC_ID of a fingerprinted sample is received at block 610. A lookup is then performed at step 620 on fingerprint database 615 to determine whether the fingerprinted audio sample is present in the database of known content. If no match is made (step 625), the chain is not updated and the next ACOUSTIC_ID representing the next frame of audio data is received at block 610. If a match is made in the database, the lookup at block 620 will return MATCHEDAD, the identification of the content that was matched in the database, and ADTIME, the time within the content block where the match was made.

A determination may then be made at block 630 as to whether the AdID is already present in the chain table. If it is not, the table is updated at block 633 with AdID, LASTTIME, LASTADTIME, and CHAINLENGTH=1. Since a fingerprint may match to multiple entries, at block 635 a determination is made of whether additional matches were returned by the database lookup at block 620. Depending on whether additional matches are made or not, control may return to block 630 to see if the additional match is already in the table, or back to block 610 to receive the subsequent frame of audio data.

Where the AdID is already present in the table, a calculation may be performed to determine whether the time signature of the new match is within the predetermined fuzziness window. In embodiments, absent the fuzziness calculation, the content segment and matched segment would need to align down to the hundredth of a second (or however specific the matching algorithm is configured). The matched segment may be running faster or slower than the content block in the database for various reasons such as hardware characteristics, program stream, compression, and so forth. Allowing for a limited amount of fuzziness compensates for these variables and can provide for more accurate matching. In embodiments, it has been found that a fuzziness setting of 0.05 s is optimal.

In embodiments, fuzziness is calculated as using the following logic: absvalue((SAMPLETIME−LASTTIME)−(ADTIME−LASTADTIME)

If the matched segment and content block are out of sync by more than the fuzziness threshold, the entry is discarded at block 645, and control returns to the check for additional matches at block 635.

If block 630 determines that the segments are aligned within the acceptable fuzziness margin, the chain table is then updated with AdID, LASTTIME, LASTADTIME, and the chain value is incremented.

At block 650, a check is made as to whether the chain length in the chain table is equal to TOTALMATCHES, the constant value that holds the total number of matches required for a match to be assumed. If no, control is returned to block 635 to check for additional matches. If yes, a match has been made, and the signal will be sent to take the desired action at block 660.

It should be understood that any discussion herein of blocks, segments, modules, or the like may refer not only to physical blocks, but also to logical blocks that may be implemented in hardware or in firmware or software running on the system.

A detailed example of an embodiment of the invention will now be described. Referring to FIG. 7*a*, the results of a first query on the fingerprint module and database are shown at time t=0.0. Five hits are returned from the database, as shown, and the chain table is populated with the AdID of each match. The LastTime column of the chain table is set to 0.0 since this is the first sample, and thus there was no preceding sample. LastAdTime is set to the value returned by the database that identifies where—as represented in seconds elapsed from the beginning of the content block—the match was made. Here, the current frame of audio matched a content block with AdId=7 at 10.0 s into the content block. The ChainLength is set to 1 since these are all new entries in the chain. The chain table following the first analysis is shown in FIG. 7*b*.

A subsequent frame of audio is then analyzed at t=0.11. The fingerprint for this frame matches 8 separate content blocks, as shown in FIG. 7*c*. The system will then proceed to verify that what has been identified matches the content in the database at approximately the same time.

For each match, a comparison is made between the actual elapsed time and the elapsed time between possible matches in a sample. The system first looks at the difference between the last sample time (in this case, t=0.0) and the current sample time (t=0.11) to identify how much time has elapsed since the last sample was taken. Similarly, the system will look at the difference between where in the content block the current match was made (here, t=0.10) and the last match (here, t=10.12) to identify how much time elapsed in the content block (or what the system at this point believes is the content block) between samples.

The difference between these two times—elapsed actual time and elapsed sample time—is calculated to determine whether there is alignment between the actual elapsed time and the elapsed time in the possible sample, which is an indicator of whether the match is valid. The difference is compared against the fuzziness factor, which is a measure of the permissible level of misalignment. Since the misalignment of 0.01 is below the permissible threshold of 0.07, the match is confirmed and the chain table is updated with the new values and an incremented ChainLength.

The process is repeated for the remaining matches. The match to AdID 7 at t=23.4 is revealed to be a mismatch since the actual and anticipated values are misaligned by 13.17, well above the threshold of 0.07. The matches to AdID 16 at t=5.31 and AdID 453 at t=0.11 are both confirmed.

The subsequent processing steps may also identify new matches not previously included in the chain table. Matches to AdIDs 8, 20, 145, and 613 were all new in this processing round and have been added to the chain table with a ChainLength of 1. The updated table after this round is shown in FIG. 7*d*.

Moving on to the next frame at t=0.22, three matches are returned (FIG. 9*e*) from the fingerprint module and database lookup. The match to AdID 7 is again confirmed and the chain length is updated to 3. AdID 14 is confirmed and the chain length is updated to 2. A match to AdID 98 is also confirmed for the first time and added to the chain table. The full chain table after the third round of processing is shown in FIG. 7*f*.

The process will continue until the ChainLength for a particular entry reaches the minimum threshold. Since Total-Matches in this example has been set to 7, a match will not be confirmed—and a signal is sent to block the content— until the ChainLength reaches that value.

It will be appreciated by those of skill in the art that the purpose of verifying matches over a course of multiple rounds of processing is to increase the accuracy of the system. Setting too low a TotalMatches threshold and false positives may be generated. Too high a setting and undesirable content may go unblocked for an extended period of time before the system reacts.

It will be understood that there are numerous modifications of the illustrated embodiments described above which will be readily apparent to one skilled in the art, including any combinations of features disclosed herein that are individually disclosed or claimed herein, explicitly including additional combinations of such features. These modifications and/or combinations fall within the art to which this invention relates and are intended to be within the scope of the claims, which follow. It is noted, as is conventional, the use of a singular element in a claim is intended to cover one or more of such an element.

I claim:

1. A system adapted to monitor a content from a program stream, the system comprising:
    an audio input subsystem configured to receive audio program data of the program stream, wherein the audio input subsystem is contained in a dongle configured to plug into an output port of a media device sourcing the program stream;
    an audio processing module contained in the dongle and configured to divide said audio program data into frames of data and generate an identifier representing at least one of the frames of data;
    a database lookup module contained in the dongle, in communication with a database of audio program content identifiers, and configured to determine whether the identifier representing the at least one of the frames of data matches an entry in said database, wherein the entry includes at least one of the audio program content identifiers;
    a chain generation module contained in the dongle and configured to evaluate series of matches with said database and determine whether an action should be taken relative to said program stream; and a signal generator contained in a standalone unit distinct from the dongle and the media device, wherein the signal generator is configured to send a command to the media device, wherein the command commands the media device to take an action relative to said program stream, wherein the dongle is configured to instruct the standalone unit to send the command based on the determining.

2. The system of claim 1, wherein the dongle contains the database.

3. The system of claim 1, wherein the output port includes an HDMI port.

4. The system of claim 1, wherein the dongle instructs the standalone unit wirelessly.

5. The system of claim 1 wherein said audio processing module is implemented as a system on a chip.

6. The system of claim 1 wherein said audio processing module further includes a digital fingerprint subsystem, wherein said digital fingerprint subsystem utilizes a Fourier transform to generate an integer value representing said frame of data.

7. The system of claim 1, wherein said standalone unit comprises one or more wireless transceivers for receiving communication with said chain generation module, and with the media device.

8. The system of claim 1, wherein said signal generator is in wireless communication with said chain generation module.

9. The system of claim 1, wherein said signal generator is configured to receive one or more infrared control codes from a remote control, and repeat a code of said one or more codes to the media device.

10. The system of claim 1, wherein said action relative to said program stream is at least one of blocking all of program stream, blocking a portion of said program stream, or changing to a different program stream.

11. A method of monitoring a content from a program stream, the method comprising:

providing a control unit comprising an audio input subsystem, an audio processing module, a database lookup module, a chain generation module, and a signal generator, wherein the audio input subsystem, the audio processing module, the database lookup module, and the chain generation module are included in a dongle configured to plug into an output port of a media device sourcing the program stream, wherein the signal generator is included in a standalone unit distinct from the dongle and the media device;

receiving audio program data of the program stream at said audio input subsystem;

causing said audio processing module to divide said audio program data into frames of data and generate an identifier representing at least one of the frames of data;

performing a lookup, using said database lookup module, in a database of audio program content identifiers and determining whether the identifier representing the at least one of the frames of data matches an entry in said database, wherein the entry includes at least one of the audio program content identifiers;

evaluating series of matches with said database;

determining whether an action should be taken relative to said program stream; and sending a signal from the standalone unit to the media device to implement said action on the media device, wherein the dongle instructs the standalone unit to send the signal based on the determining.

12. The method of claim 11, wherein the dongle includes the database.

13. The method of claim 11, wherein the output port includes an HDMI port.

14. The method of claim 11 wherein said audio processing module further includes a digital fingerprint sub-method, wherein said digital fingerprint sub-method utilizes a Fourier transform to generate an integer value representing said frame of data.

15. The method of claim 11, wherein said standalone unit is in wireless communication with said chain generation module.

16. A system adapted to block a content from a program stream, the system comprising:

a means for receiving audio program data of the program stream, wherein the receiving means is contained in a dongle configured to plug into an output port of a media device sourcing the program stream;

a means for dividing said audio program data into individual frames, wherein the dividing means is contained in the dongle;

a means for generating a digital fingerprint identifier representing at least one of the individual frames, wherein the generating means is contained in the dongle;

a database lookup means for determining whether the identifier representing the at least one of the individual frames matches an entry in a database, wherein the database lookup means and the database are contained in the dongle, wherein the entry includes an audio program content identifier;

a chain generation means for evaluating series of matches with said database and determining whether said program stream should be blocked or unblocked, wherein the chain generation means is contained in the dongle; and a signal generator means for sending a block signal to a media device to implement the block signal on the media device, wherein the signal generator means is contained in a standalone unit distinct from the dongle and the media device, wherein the dongle is configured to instruct the standalone unit to send the block signal based on the determining.

17. The system of claim 16, wherein said means for generating a digital fingerprint identifier includes a digital fingerprint subsystem, wherein said digital fingerprint subsystem utilizes a Fourier transform to generate an integer value representing said frame of data.

18. The system of claim 16, wherein said signal generator means is in wireless communication with said chain generation means.

19. The system of claim 16 wherein said database contains digital fingerprint data representing segments of commercial television content.

20. The system of claim 16, wherein said signal generator means is configured to emulate a remote control of said media device.

* * * * *